United States Patent [19]

Chappelle

[11] Patent Number: 5,949,976

[45] Date of Patent: Sep. 7, 1999

[54] COMPUTER PERFORMANCE MONITORING AND GRAPHING TOOL

[75] Inventor: David W. Chappelle, Colorado Springs, Colo.

[73] Assignee: MCI Communications Corporation, Washington, D.C.

[21] Appl. No.: 08/724,621

[22] Filed: Sep. 30, 1996

[51] Int. Cl.[6] .................................................. H01J 13/00
[52] U.S. Cl. ........................................................ 395/200.54
[58] Field of Search .......................... 395/200.54, 200.55, 395/200.53, 182.02, 184.01

[56] References Cited

U.S. PATENT DOCUMENTS

| | | | |
|---|---|---|---|
| 5,243,543 | 9/1993 | Notess | 395/200.54 |
| 5,504,880 | 4/1996 | Hirosawa et al. | 395/200.54 |
| 5,557,547 | 9/1996 | Phaal | 395/200.54 |
| 5,606,664 | 2/1997 | Brown et al. | 395/200.54 |
| 5,619,656 | 4/1997 | Graf | 395/200.54 |
| 5,638,514 | 6/1997 | Yoshida et al. | 395/200.54 |
| 5,668,944 | 9/1997 | Berry | 395/184.01 |
| 5,696,486 | 12/1997 | Poliquin et al. | 395/200.54 |
| 5,696,701 | 12/1997 | Burgess et al. | 395/200.54 |
| 5,712,979 | 1/1998 | Graber et al. | 395/200.54 |
| 5,715,393 | 2/1998 | Nnaugle | 395/182.02 |
| 5,727,129 | 3/1998 | Barrett et al. | 395/200.54 |
| 5,784,564 | 7/1998 | Camaisa et al. | 395/200.54 |

*Primary Examiner*—Nabil Hindi

[57] ABSTRACT

A computer system performance monitoring and graphing tool system for collecting performance data from computer system with various operating systems, converting the performance data to graphical representations, storing the graphical representations in a database, and providing on-demand displaying of the graphical representations of the performance data. A computer program product that operates on each production computer collects that computer's performance data from the operating system, using native commands and facilities of the operating system. Another computer that serves as a central collection system receives performance data from each production computer, parses the data, builds daily graphical representations of the data, and stores these graphical representations as Graphical Image Files (GIF). Access to and viewing of GIF files may be provided by several methods, including an Internet (or IP) network for access and a web browser for viewing.

14 Claims, 10 Drawing Sheets

```
#DT07/08/96_00:00#PRNETSCAN #HNnetdbn_usUSR_sySYS_waWIO_suSWAP_USED %cb;CP
U_USAGE;(pct._busy);;;-011p00Page_insp01Page_outsppp;PAGE_INS_&;PAGE_OUTS;P
ER_MINUTE;;u00Users uuu;USERS;LOGGED;ON;;d00hdisk0 d01hdisk1 d02hdisk2 d03hdi
sk3_d04hdisk4 d05hdisk5 d06hdisk6 d07hdisk7 d08hdisk8 d09hdisk9 ddd;TOP_5;DISK_
DRIVES;(pct._busy);;n00IP_packets_inn01IP_packets_outn02IP_packet_errorsn03
SNA_packets_inn04SNA_packets_outn05_SNA_packet_errorsnnNETWORK;IP_and_SNA;P
ACKETS_IN,;OUT,_ERRORS;PER_MINUTE%CB49_US12_SY22_WA15 P000 P010_SU42 D0019
 D010 D022 D030 D040 D050 D060 D070 D080 D091 N00687 N01907 N020 N03934 N04276
N050 U003
#DT07/08/96_00:10 %CB45_US10_SY21_WA14 P004 P010_SU42 D0018 D0010 D021 D030
D040 D050 D060 D070 D080 D090 N00730 N01923 N020 N03851 N04244 N050 U003
#DT07/08/96_00:20 %CB50_US13_SY22_WA15 P000 P010_SU42 D0019 D010 D022 D030
D040 D050 D060 D070 D080 D090 N00844 N01112O N020 N03820 N04230 N050 U003
#DT07/08/96_00:30 %CB100_US11_SY31_WA58 P000 P010_SU42 D0048 D0163 D0226 D0
32 D040 D0556 D0622 D0722 D0823 D0926 N00576 N01671 N020 N03677 N04192 N050 U00
3
#DT07/08/96_00:40 %CB64_US9_SY23_WA32 P002108 P017319_SU42 D0041 D010 D021
D030 D040 D050 D060 D070 D080 D090 N00472 N01466 N020 N03366 N04102 N050 U003
#DT07/08/96_00:50 %CB77_US11_SY27_WA39 P00315 P01186_SU42 D0049 D012 D023 D
030 D040 D051 D061 D072 D082 D092 N00646 N01773 N020 N03820 N04230 N050 U003
#DT07/08/96_01:00 %CB58_US12_SY25_WA22 P001031 P01346_SU42 D0021 D0112 D024
 D030 D040 D051 D061 D072 D082 D092 N00680 N01825 N020 N03580 N04161 N050 U003
#DT07/08/96_01:10 %CB76_US20_SY27_WA29 P00858 P01612_SU42 D0023 D0114 D025
D030 D040 D053 D063 D074 D088 D094 N00582 N01668 N020 N03353 N0498 N050 U003
```

702

FIG. 7

COMPUTER PERFORMANCE MONITORING AND GRAPHING TOOL

BACKGROUND OF THE INVENTION

1. Field of the Invention

The present invention relates to a computer system network in general, and in particular, to a computer performance monitoring and graphing tool for collecting computer performance data, converting the performance data to graphical representations, and storing the graphical representations for on-demand viewing using a web browser.

2. Related Art

A computer system network in a production environment, whether a local area network (LAN), a wide area network (WAN), or any group of computers connected together to facilitate transfer of information between them, must be managed. In managing the network, the computer system network manager must concern herself with, among other things, the behavior and effectiveness of computer system resources and related communication activities. Managing network performance involves monitoring the performance of resources and activities in order to detect deterioration in the overall quality of the monitored parameters. Performance monitoring may also be designed to detect characteristic patterns (or trends) before service quality has dropped below an acceptable level. In furtherance of these and other objectives, the network manager tracks the network usage by gathering the appropriate computer system data for determining performance.

For the computer systems used in a production environment, parameters to be monitored include, but are not limited to, central processing unit (CPU) utilization percentage, disk drive usage, network communications packet traffic, and the number of users logged on to a server computer, for example. These parameters may be used to analyze trends in computer system network performance. The trending of performance may be over a period of hours or over a period of days. Trending is valuable because it can provide insight into normal and abnormal performance data. Trending can also provide early warnings of performance problems.

Performance monitoring is a particularly powerful tool for quantifying subtle problems, locating intermittent causes of degradation, anticipating failures that are preceded by gradual increases in error rates, and verifying the quality of production over a long period, for example. When the statistical performance of a computer drops from an acceptable level to an unacceptable level, or significantly toward an unacceptable level, repair can be started, even if a user has not reported a failure or deteriorated performance.

This is especially important when computer systems involve multiple vendors because the likelihood of faults and inefficiencies increases. The costs of fault and inefficiencies can be far reaching. For example, failures in a telecommunications network could prevent receipt of emergency (or 911) calls or could paralyze a major international airport for a significant period of time. Likewise, failures in a financial institute's computer system could result in loss of automated teller machines, domestic (or international) electronic funds transfers, and posting of the day's receipts and debits, for example. Of course, loss of life is quite an incentive for a computer system network manager to conduct performance monitoring in order to detect and quantify a decline in network performance.

Computer system networks typically have computers running with different operating systems. The multi-vendor environment of today may find performance monitoring systems responsible for monitoring the performance of mainframes running with operating systems such as MVS or VMS. Performance monitoring systems may be responsible for monitoring mid-range computers running with different versions of UNIX or VMS. Performance monitoring systems may even be responsible for monitoring microprocessors running with DOS or OS/2. Consequently, conventional performance monitoring systems must interface with each of the various operating systems. That is, conventional performance monitoring systems typically are operating system specific. A performance monitoring system that monitors a computer using UNIX may not be able to monitor a computer running DOS. Likewise, a performance monitoring system tracking performance of a computer running VMS may not be able to monitor a computer running OS/2.

Some goals of performance management in a production environment are to reduce expenses, to protect or increase revenue, and to improve service by improving the utilization of resources and the ability of the resources to meet user service level objectives. It is also desirous to accomplish the performance monitoring objectives associated with this goal in a non-intrusive manner. That is, computer system performance monitoring optimally is transparent to computer system users.

There are a number of obstacles to reaching these goals. First, conventional performance monitoring tools are limited because they are susceptible to mistakes. This is because conventional performance monitoring involves considerable human interface, as well as other semi-automated sub-processes. Conventional performance monitoring and trend analysis of computer systems that have dissimilar operating systems invariably requires manual examination of raw performance data, as well as manual trend analysis.

Second, conventional performance monitoring is limited because it is labor intensive. Because there may be a different operating systems for each individual computer system resource and because each piece of equipment may have unique communication requirements depending on the particular manufacturer, a different performance monitoring tool may have to be designed for each individual operating system or piece of equipment.

Today, computer system network managers are increasing the complexity of their network to meet (actual or anticipated) user demands and to take advantage of emerging technologies. Moreover, both the efficiency and the integrity of the conventional process of performance monitoring would be greatly improved if an automated system for gathering and trending performance data were provided. In order to meet the challenges presented now and in the future, what is needed is a computer performance monitoring and graphing tool that reduces the amount of time and the risks of errors, and also functions regardless of the operating systems in use.

SUMMARY OF THE INVENTION

Briefly stated, the present invention is directed to a computer system performance monitoring and graphing tool that monitors and produces graphical representations of the performance of equipment in a production center. The computer system performance monitoring and graphing tool utilizes an Internet network and web browsers to provide on-demand viewing of the graphical representations.

The production center includes a plurality of production computers (and peripheral components), a central collection system for collecting the performance data, and an electronic mail network to communicate with the production computers and the central collection system.

The electronic mail network uses messages that have headers and text. The text of the electronic mail message includes a data log representing the performance data of the particular computer or peripheral component.

Each production computer (or peripheral component) has an operating system or (communication mode), performance data, a system clock, a data log for storing the collected performance data, and a data collection script for determining which performance data to collect. Each operating system has a scheduler for initiating and terminating tasks. Each system clock has a time-of-day clock for providing date and time to the computer system performance monitoring and graphing tool.

The central collection system has a parser script for separating the electronic mail message header from the electronic mail message text, a conversion program for converting the electronic mail message text into graphical image files, and a graphical image files database for storing the graphical image files. At least one web server is coupled to the graphical images files database. At least one web browser is coupled to the web server via an Internet (or IP) network.

The computer system performance monitoring and graphing tool operates by collecting performance data from each production computer (or peripheral component) utilizing the data collection script. The computer system performance monitoring and graphing tool then converts the collected performance data to graphical representations utilizing the conversion program. The computer system performance monitoring and graphing tool then stores the graphical representations in the graphical image file database for on-demand viewing using the web browsers.

Further features and advantages of the invention, as well as the structure and operation of various embodiments of the invention, are described in detail below with reference to the accompanying figures.

BRIEF DESCRIPTION OF THE FIGURES

The invention is best understood by reference to the figures wherein references of like reference numbers indicate identical or functionally similar elements. In addition, the left-most digits refer to the figure in which the reference first appears in the accompanying figures, in which:

FIG. 7 is an exemplar of a data log;

DETAILED DESCRIPTION OF THE PREFERRED EMBODIMENTS

Overview of the Invention

The present invention is directed towards a computer performance monitoring and graphing tool that collects performance data from various operating systems on multiple production computers, converts the performance data to a graphical representation, and stores the graphical representation for on-demand viewing. Graphical representations may be tailored to particular needs, including making the graphical representations available on the world wide web.

Example Environment

Figure 1:
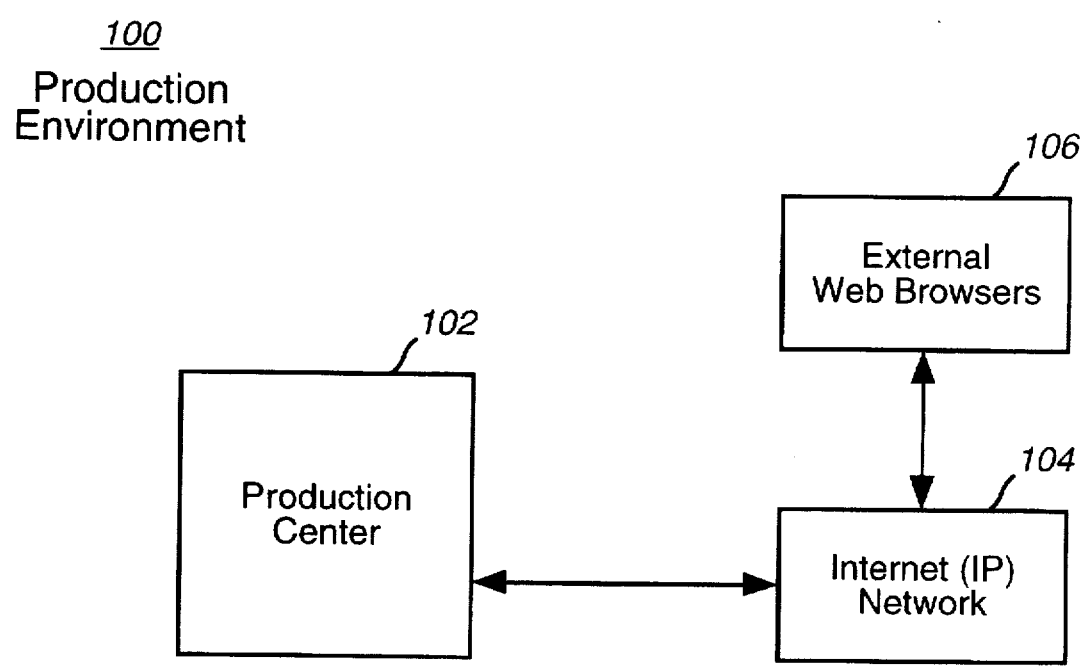
FIG. 1 is a block diagram of a production environment suitable for implementation of a preferred embodiment of the present invention.

FIG. 1 is a block diagram of a production environment 100 suitable for implementation of a preferred embodiment of the present invention. Production environment 100 includes a production center 102, an Internet (IP) network 104, and an external web browser 106. Production center 102 bidirectionally communicates with Internet (P) network 104. Internet (IP) network 104 bidirectionally communicates with external web browser 106. Production center 102, in a preferred embodiment, is located in a telecommunications environment.

Production center 102 may be any facility with computer systems, such as a manufacturing facility, a telecommunications network a multinational corporation, a financial institution, or a university, for example.

Internet network 104 is comprised of several large computer networks interconnected together over high-speed data links. The interconnected networks share the same network address scheme and use the transmission control protocol/Internet protocol (or TCP/IP). Internet networks, such as Internet network 104, are well known.

External web browser 106 is software that navigates Internet network 104 external web browser 106 enables a user to move easily from one world wide web site to another world wide web site. Web browsers, such as web browser 106, are well known.

Figure 2:
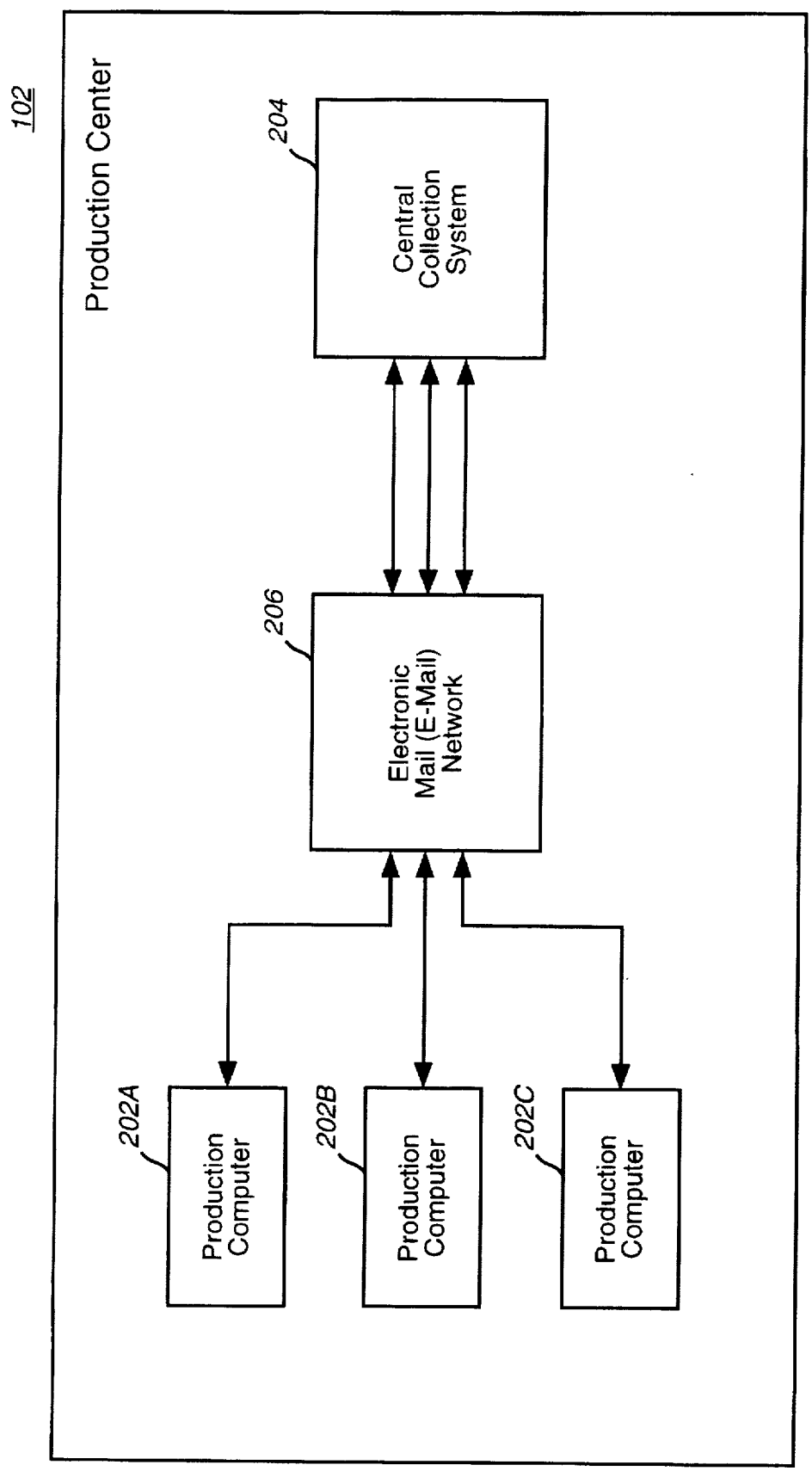
FIG. 2 is a block diagram of a production center.

FIG. 2 is a block diagram of production center 102. Production center 102 includes a plurality of production computers 202, as represented by production computers 202A through 202C, a central collection system 204, and an electronic mail (or E-mail) network 206. Production computers 202 communicate with central collection system 204 via E-mail network 206.

Any of production computers 202 may be a mainframe computer, such as an IBM MVS, a DEC VAX for example. Alternatively, production computers 202 may be a mid-range computer (or high-performance workstation), such as a RISC System/6000 (available from International Business Machines (or IBM)) or a DEC Alpha (available from Digital Equipment Corporation). Alternatively, still, production computers 202 may be a personal computer, such as an IBM PC, for example.

Production computers 202 may be arranged in local area network (or LAN) configuration. Production computers 202 located in a LAN may be personal computers (or PCs), mainframes, or mid-range computers linked together in a building or in a group of buildings within a few miles of each other. Production computers 202 may be located in a wide area network (WAN) wherein production computers 202 may be personal computers (or PCs), mainframes, or mid-range computers linked together but geographically separated by great distances. Production computers 202 also may be a series of stand-alone devices not necessarily in communication with each other.

Central collection system 204 is itself a computer. In a preferred embodiment, the central collection system 204 operates on a UNIX platform. Central collection system 204 communicates with production computers 202 via E-mail network 206.

Electronic mail (or E-mail) network 206 is a store and forward service for text and graphic-based messages from one computer terminal or system to another. Electronic mail network 206 may or may not be a TCP/IP Internet network. The text is stored for the recipient until that person logs into the system to retrieve messages. E-mail messages typically include text and a header.

Figure 3:
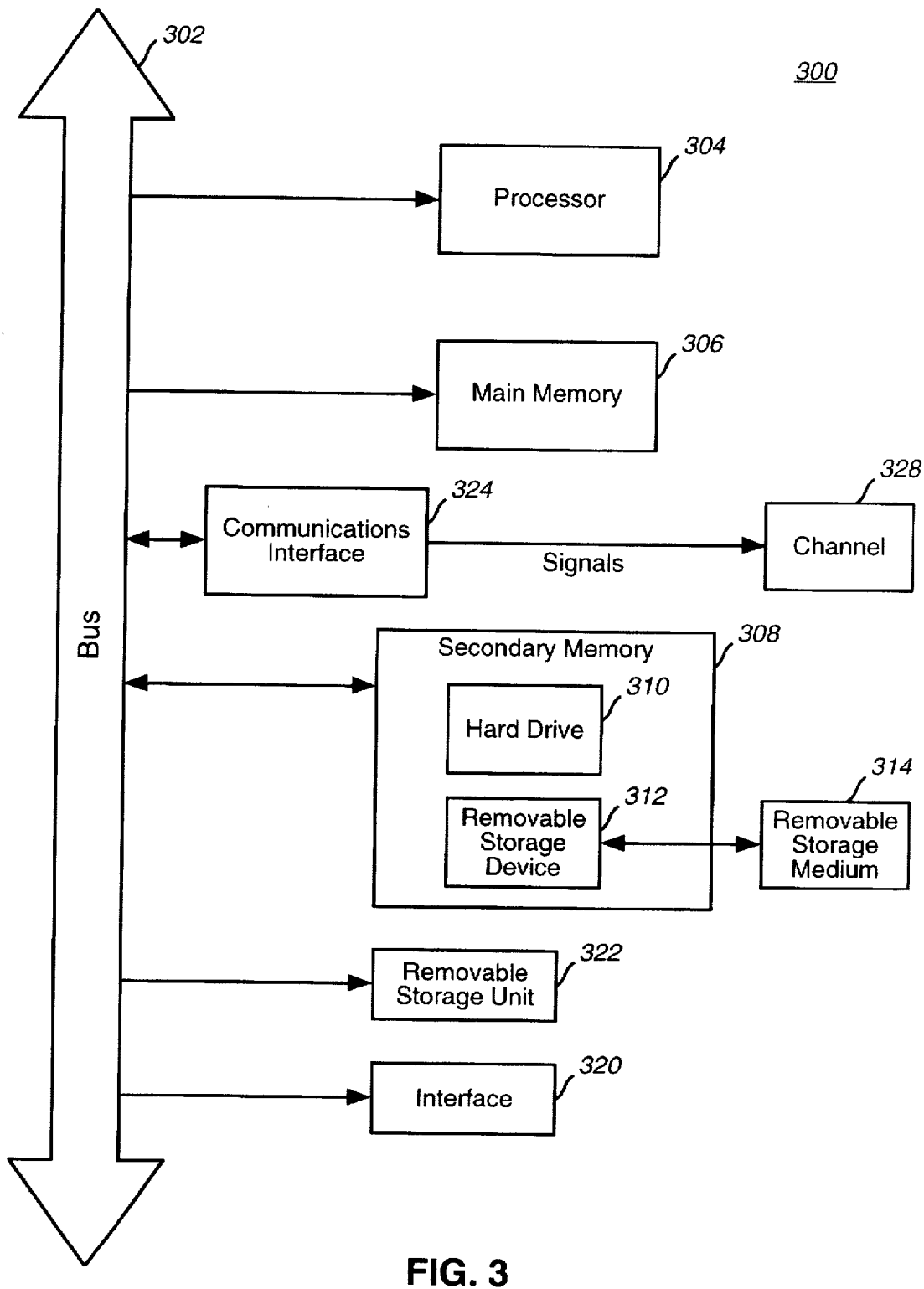
FIG. 3 is a block diagram of a computer system representing a preferred implementation of many components of the present invention.

The present invention may be implemented using hardware, software or a combination thereof and may be implemented in a computer system or other processing system. In fact, in one embodiment, the invention is directed toward a computer system capable of carrying out the functionality described herein. An example computer system 300 is shown in FIG. 3. Computer system 300 includes a communication bus 302, one or more processors, such as processor 304. Processor 304 is connected to communication bus 302. Various software embodiments are described in terms of this example computer system. After reading this description, it will become apparent to a person skilled in the relevant art how to implement the invention using other computer systems and/or computer architectures.

Computer system 300 also includes a main memory 306, preferably random access memory (RAM), and can also include a secondary memory 308. Secondary memory 308 can include, for example, a hard disk drive 310 and/or a removable storage device 312, representing a floppy disk drive, a magnetic tape drive, an optical disk drive, etc. Removable storage device 312 reads from and/or writes to a removable storage medium 314 in a well known manner. Removable storage medium 314, represents a floppy disk, magnetic tape, optical disk, etc. which is read from and written to by removable storage device 312. As will be appreciated, removable storage medium 314 includes a computer usable storage medium having stored therein computer software and/or data.

In alternative embodiments, secondary memory 308 may include other similar means for allowing computer programs or other instructions to be loaded into computer system 300. Such means can include, for example, a removable storage unit 322 and an interface 320. Examples of such can include a program cartridge and cartridge interface (such as that found in video game devices), a removable memory chip (such as an EPROM or PROM) and associated socket, and other removable storage units 322 and interfaces 320 which allow software and data to be transferred from the removable storage medium 314 to computer system 300.

Computer system 300 can also include a communications interface 324. Communications interface 324 allows software and data to be transferred between computer system 300 and external devices. Examples of communications interface 324 can include a modem, a network interface (such as an Ethernet card), a communications port, a PCM-CIA slot and card, etc. Software and data transferred via communications interface 324 are in the form of signals 326 which can be electronic, electromagnetic, optical or other signals capable of being received by communications interface 324. These signals 326 are provided to communications interface via a channel 328. This channel 328 carries signals 326 and can be implemented using wire or cable, fiber optics, a phone line, a cellular phone link, an RF link and other communications channels.

In this document, the terms "computer program medium" and "computer usable medium" are used to generally refer to media such as removable storage device 318, a hard disk installed in hard disk drive 310, and signals 326. These computer program products are means for providing software to computer system 300.

Computer programs (also called computer control logic) are stored in main memory 306 and/or secondary memory 308. Computer programs can also be received via communications interface 324. Such computer programs, when executed, enable the computer system 300 to perform the features of the present invention as discussed herein. In particular, the computer programs, when executed, enable the processor 304 to perform the features of the present invention. Accordingly, such computer programs represent controllers of the computer system 300.

In an embodiment where the invention is implemented using software, the software may be stored in a computer program product and loaded into computer system 300 using removable storage device 312, hard drive 310 or communications interface 324. The control logic (software), when executed by the processor 304, causes the processor 304 to perform the functions of the invention as described herein.

Figure 4:
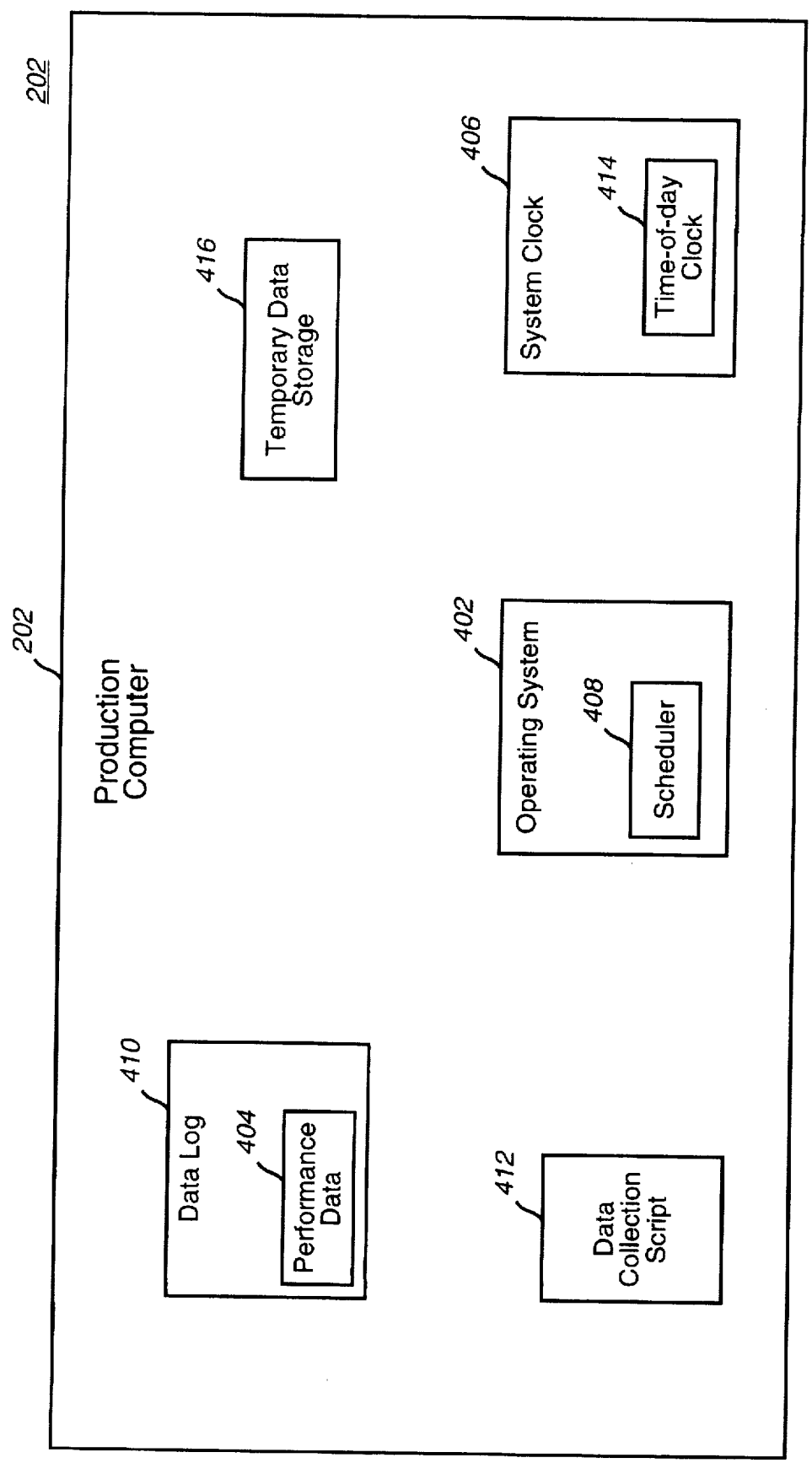
FIG. 4 is a block diagram of an operating system of a production computer.

FIG. 4 is a block diagram of one of production computers 202. Production computer 202 includes an operating system 402, performance data 404, and a system clock 406. Operating system 402 includes a scheduler 408. Production computer 202 also includes a data log 410 and a data collection script 412.

Operating system 402 is a computer program that manages the hardware and software of production computer 202. The main function of operating system 402 is to run other programs and to control peripheral equipment.

When, for example operating system 402 is running on an IBM, the operating system 402 is typically MVS. When operating system 402 is running on a mainframe computer, such as an a DEC VAX, for example, then operating system 402 is typically VMS. Alternatively, operating system 402 may be DOS, OS/2, or versions of UNIX.

Performance data 404 is typically data associated with performance parameters that must be controlled in order to render service that is satisfactory to users. Performance data 404 may be data associated with the characteristics of the geographical area where the production computer 202 is located. For example, performance data 404 may be information on the percentage of utilization of processors, such as processor 304, the percentage of usage of hard drives, such as hard drive 310, the number of communications packets sent and received by components within production center 102, and the number of users logged onto server production computers 202. Performance data 404 is traditionally gathered and maintained on a per device basis.

System clock 406 provides for synchronization of production computer 202's internal components. Operation of system clock 406 is well known.

Scheduler 408 initiates and terminates particular tasks. Scheduler 408 also allocates the appropriate computer resources required. In a preferred embodiment, scheduler 408 is "cron" (for UNIX). The "cron" program is used to executed programs at specified times, especially unattended programs running in the middle of the night. For an example of how to use cron to run programs at specified times, see The UNIX Operating System, 2d ed. p. 363, by Kaare Christian (1988).

Data log 410 is a logfile for storing performance data 404. Data log 410 also stores flags and identifiers. In a preferred embodiment, data log 410 is a text logfile. A single data log 410 represents one day's data.

Data collection script 412 enables the collection performance data 404 from production computers 202 on a periodic basis (e.g., every ten minutes). Data collection script 412 specifies which data to extract. Data collection script 412 also specifies certain flags. The flags indicate the type of graphical representation to be produced with the collected performance data 404.

Data collection script 412 adds other fields to specify a project name and a host name. The project name is an arbitrary name assigned to the applications and/or resources operated by production computers 202. The host name identifies a particular production computer 202.

System clock 406 also includes a time-of-day clock 414 for computer system 202. Time-of-day clock 414, also referred to as a real-time clock, maintains the time of day by keeping track of regular hours, minutes, and seconds. Time-of-day clock 414 makes the time of day available to computer programs. Time-of-day clock 414 in conjunction with scheduler 408 provide timing signals to control the operation of the present invention.

Temporary data storage 416 is a file that stores cumulative data from one pass of data collection. The cumulative data stored in temporary data storage 416 is used for comparison with cumulative data collected in a succeeding data collection pass. Implementation of temporary data storage 416 is well known.

Figure 5:
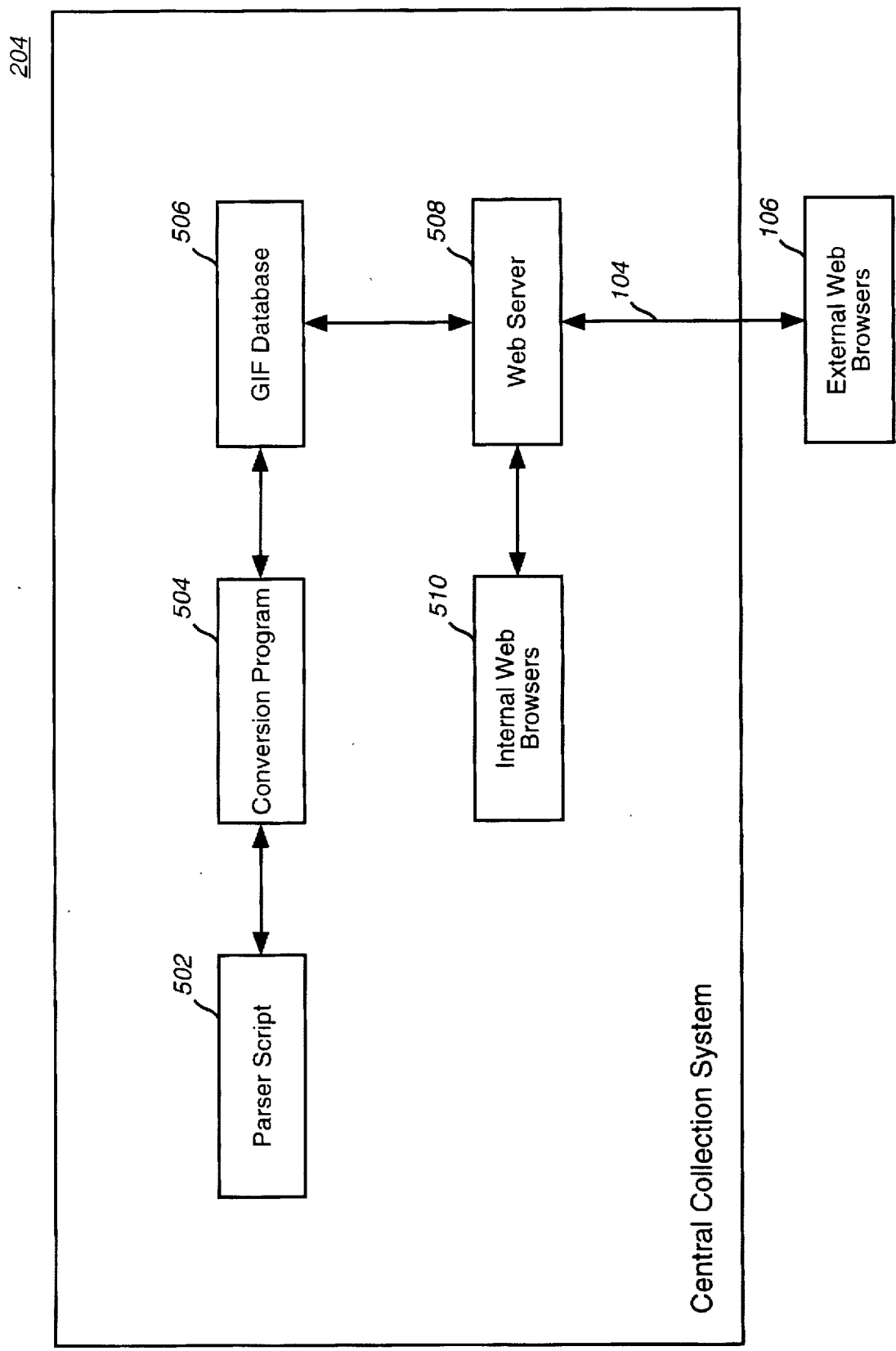
FIG. 5 is a block diagram of a central collection system of a production center.

FIG. 5 is a block diagram of central collection system 204. Central collection system 204 includes a parser script 502, a conversion program 504, a GIF database 506, at least one web server 508, and at least one internal web browser 510.

Parser script 502 is software written in native commands of the operating system of central collection system 204. In a preferred embodiment, the central collection system 204 is on a UNIX platform, and, as such, parser script 502 is written in UNIX. Parser script 502 communicates with conversion program 504.

Parser script 502 is capable of performing text file scanning to search for predetermined information. In a preferred embodiment, parser script 502 removes e-mail message headers from e-mail messages, leaving only the text of data log 410. Parser script 502 is also capable of extracting the date, project name, and host name fields from the first line of data log 410. These three fields are used to uniquely specify a directory and filename for storing a GIF file that will be produced.

In a preferred embodiment, conversion program 504 is software that is written in the C programming language. Conversion program 504 reads data log 410 text from a temporary file. Conversion program 504 also reads the flags specified by data collection script 412 that indicate the type of graphical representation to be produced from the collected performance data 404. Conversion program 504 then proceeds to build the graphical representations using the data from data log 410.

GIF database 506 stores the date, project name, and host name fields of data log 410. The date, project name, and host name fields from the first line of data log 410 fields are used to uniquely specify a directory and filename for storing graphical image files. The directories and filenames that are used correspond directly to the performance data 404, project name, and host name of the data log 410.

GIF database 506 stores the graphical representations as graphical image files (or GIF files). GIF is a standard format, and is well established in the industry for the display of graphical data.

There are several methods of providing access to GIF files stored in GIF database 506. Internal web browsers 510 may provide direct access to and on-demand display of graphical image files to internal users (i.e., to production center 102).

This may be accomplished using an Intranet (internal TCP/IP network) to provide multiple users at various sites access to graphical representations of performance data 404. External users (i.e., external to production center 102) may use IP network 104 and their own external web browsers 106 to access and have on-demand viewing of graphical image files.

Conventional Performance Monitoring

Conventional performance monitoring involves the statistical measurement of equipment errors and usage, and information (or traffic) flow within a computer system. Data is typically gathered from each piece of equipment of interest either manually or in a semi-automated manner. Performance monitoring and trend analysis of computer systems that have dissimilar operating systems invariably requires manual examination of raw performance data. Moreover, because there may be a different operating systems for each individual computer system resource and because each piece of equipment may have unique communication requirements depending on the particular manufacturer, a different performance monitoring tool may have to be designed for each individual operating system or piece of equipment. For example, network communications packet traffic for local area networks (LANs) can be monitored and graphically displayed utilizing an HP LanProbe available from Hewlett Packard may be used computers running MS-DOS or UNIX, but cannot be used on a DEC VAX.

Computer Performance Monitoring and Graphing Tool Operation

The computer performance monitoring and graphing tool of the present invention has as a feature data collection script 412 software written in the native commands of each operating system 402. (Scripting is the process of using a programming language to automate functions.) This feature allows performance data 404 from any production computer 202 running any operating system 402 to be collected and analyzed on the computer system performance monitoring tool of the present invention irrespective of the operating system.

Another feature of the present invention is its flexibility. The present invention is not restricted to collecting a single type of performance data 404. Different types of performance data 404 may be added to the collection process by modifying data collection script 412.

The computer performance monitoring and graphing tool of the present invention collects performance data 404 from operating system 402 and writes performance data 404 to data log 410. Data log 410 stores performance data 404 in daily batches. Each line in data log 410 includes performance data for a single iteration of data collection script 412. Each line in data log 410 also includes a date/time field (as provided by system clock 406). For each execution, data collection script 412 checks the last line of data log 410 and compares the date field with the current system date for the particular production computer 202. If a change in date is detected, the data collection script 412, copies data log 410 and E-mails it to parser script 502. Data collection script 412 then clears data log 410 and begins collecting and storing performance data 404 for the new date.

Figure 6:
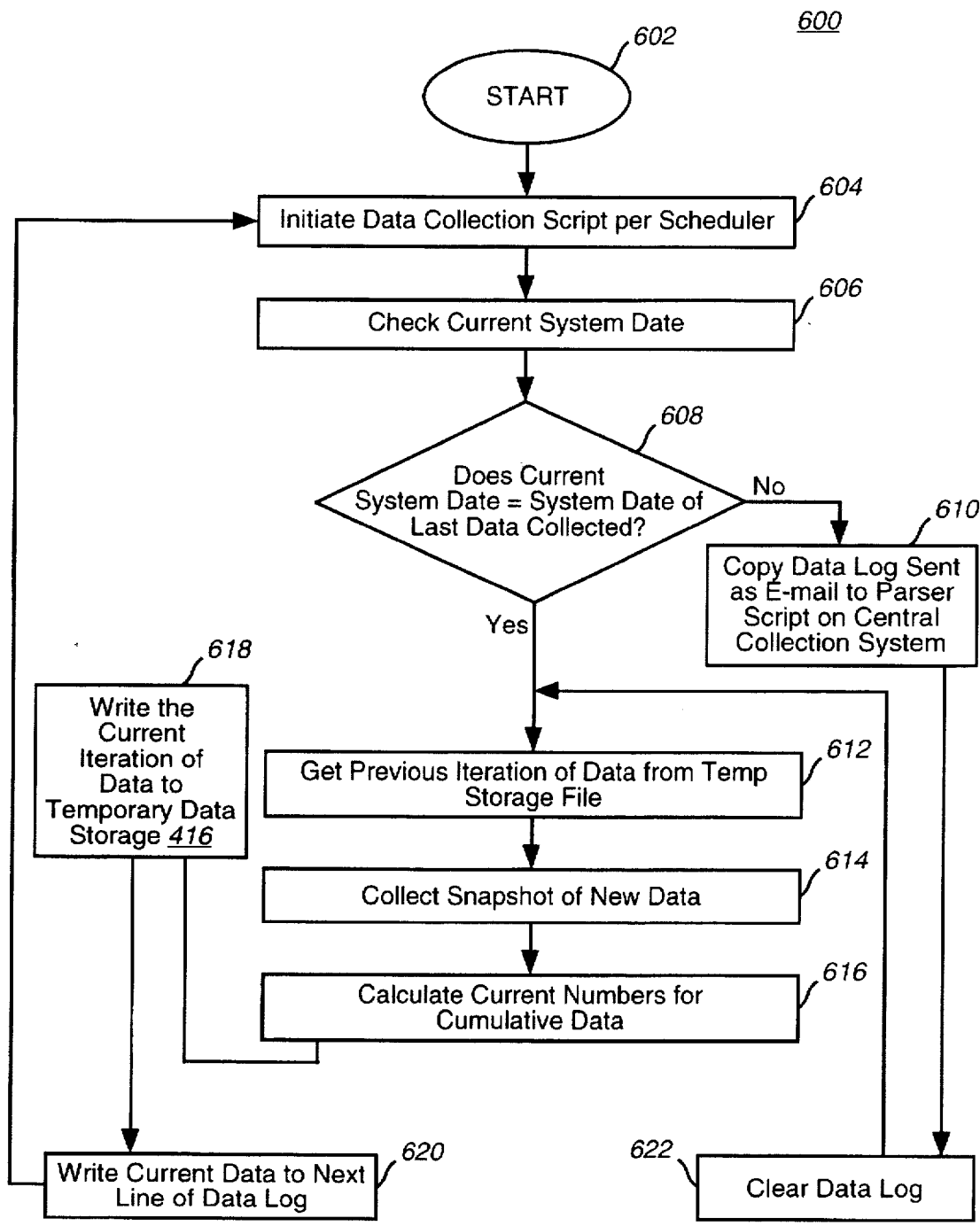
FIG. 6 is a flowchart of the operation of a data collection script.

FIG. 6 is a flowchart 600 of the operation of data collection script 412. Data collection script 412 is programmed to run at regular intervals, such as every 10 minutes. Operation of flowchart 600 begins with step 602, where control immediately passes to step 604.

In step 604, scheduler 408 initiates data collection script 412. In step 606, data collection script 412 checks the current system date and compares it with the system date of the previous iteration.

In step 608, a date check is performed. This is to ensure that all of the performance data 404 to be written to data log 410 originate from the same day. If a new date is detected, then control of flowchart 600 passes to step 610. If not, then control of flowchart 600 passes to step 612.

In step 610, data log 410 is copied and sent as a message via E-mail network 206 to central collection system 204. Control of flowchart 600 passes to step 622.

In step 622, data log 410 is cleared for the new date.

If, as determined in step 608, a new date is not detected, then the control of flowchart 600 passes to step 612. In step 612, data collection script 412 retrieves performance data 404 of the last iteration from temporary storage file 416. This last step is performed because calculations may be performed on performance data 404 that are cumulative. The performance data 404 that are cumulative, may have current values calculated. An example is the number of communications packets sent by components within production center 102, the value of which is accumulated by operating system 402. In this case, the value collected from the last iteration of data collection script 412 is subtracted from the value collected from the current iteration. This difference is then divided by ten (for ten-minute intervals) to obtain the number of networks packets sent per minute. Some performance data 404 are meaningful as a raw value and need only be collected and reported "as is." An example is current information on the percentage of utilization of processors, such as processor 304, which can be determined during each iteration of data collection script 412 without having to compare it to previous performance data 404.

In step 614, a snapshot of new performance data 404 is collected from operating system 402. In a preferred embodiment, performance data 404 is collected from IOSTAT when operating in AIX UNIX.

In step 616, calculations needed to obtain values for cumulative performance data 404 are performed. For example, the previous value for network packets received is subtracted from the current value for network packets received, then divided by ten to get the number of network packets received per minute for the current iteration.

In step 618, cumulative data is written to temporary storage file 416 to be used to calculate cumulative data on the next iteration. In step 620, data collection script 412 writes the current performance data 404 to the next line of current data log 410. Following completion of step 620, operation of flowchart 600 passes to step 604, where performance data 404 collection process continues with the next iteration of data collection script 412.

An example of a data log format 702 that may be used for data log 410 is depicted in FIG. 7. Other formats may be used without departing from the spirit of the invention. The format in data log format 702 provides conversion program 504 with an automated capability to produce graphical representations of performance data 404. Each line of data log 702 represents one iteration of data collection script 412.

All data, whether performance data 404, text, project, host, or the date/time, is preceded by a three-character flag. For example, the date/time field is preceded by the flag "#DT." Each line of data log 410 begins with this flag field. The example in FIG. 7 shows the first eight lines of data log 410 in which data collection script 412 ran every ten minutes. This is evidenced by the ten-minute increments in the date/time field of each line. In the first line, the value of the date/time field, indicated by "#DT," is "Jul. 8, 1996 00:00," indicating this is the first entry of the day.

The first line of data log 410 contains all of the fields needed to identify the graphical representations that are to be created and the directory/filename in which these graphical representations are to be stored. The first line also contains actual performance data 404 that was collected from the first iteration of data collection script 412. The subsequent lines only contain a date/time field and actual performance data 404 to be entered in the graphical representations.

Fields that are included in the first line of this example of data log 702 are depicted in Table 1.

TABLE 1

Data log 702 Exemplar

| Flag | Field | Value in example |
|------|-------|------------------|
| #DT | date/time | 07/08/96 00:00 |
| #PR | project | name NETSCAN |
| #HN | host name | netdbn |

Other fields in this line specify certain graphical representations to be created and assigns names to them for identification. A three-character flag serves as a unique name for assigning values to each graphical representation. For instance, bar graphical representations use a "_" flag, followed by a unique 2-character name. Likewise, composite percentage line graphical representations of the percentage of time a CPU is busy over a period of time, for example, use a "%" flag, followed by a unique 2-character name. The performance data 404 that follows these flags are used in text blocks as graphical representation titles.

Non-composite percentage line graphical representations of the instantaneous percentage of time a CPU is busy may be produced as an array, in which multiple graphical representations are plotted on a single chart. These use a single-letter flag, uniquely identifying the array, followed by a two-digit sequential number identifying the value in the array. A flag that has the single-letter identifier of the array repeated three times assigns a title to the chart. For example, a two-valued array may be specified by flags "P00" and "P01", and the chart on which these two graphical representations will be plotted will be specified by the flag "ppp". Following these flags will be text blocks that represent graphical representation/chart titles.

Exemplar fields for identifying graphical representations that are included in the first line of data log 702 are depicted in Table 2.

| Flag | Graphical Representation Type | Graphical Representation Title |
|------|------------------------------|-------------------------------|
| _us | bar graphical representation | USR |
| _sy | bar graphical representation | SYS |
| _wa | bar graphical representation | WIO |
| _su | bar graphical representation | SWAP_USED |
| % cb | comp percentage line graphical representation | CPU_USAGE;(pct.-busy) |
| P00 | line graphical representation | Page_ins |
| P01 | line graphical representation | Page_outs |
| ppp | chart for plotting p00 and p01 | PAGE_INS_&;PAGE_OUTS; PER_MINUTE |
| U00 | line graphical representation | Users |
| uuu | chart for plotting u00 | USERS;LOGGED;ON |

*In text blocks, a ";" character indicates a new line and a "_" character indicates a space.

In this example, "P00" and "P01" are two graphical representations that will be plotted on a single chart; this chart is identified as "ppp". This will be read by conversion program 504 as a two-valued array. Using the same convention, and still on the first line of data log 702, fields flagged by "d00" through "d09" identify a ten-valued array. Values for these fields will produce ten different graphical representations on a single chart, which is identified as "ddd". The titles for the individual "d" graphical representations are "hdisk0" through "hdisk9". The title for the overall "ddd" chart will be "TOP5:DISKDRIVES:(pct. busy)".

Remaining fields preceded with an "n" identify more graphical representations to be produced.

Still on the first line of data log 702, a second field preceded with a "% CB" flag can be found. This designates the beginning of actual data fields. Wherever a "% CB" flagged field is written, the proceeding value ("49") will be represented in the % cb graphical representation. Likewise, the next field—"US 12"—indicates that the value "12" is to be graphical represented in the 0 us graphical representation.

The second line of data log 702 begins with a date/time field, flagged by "#DT" and with the value "Jul. 8, 1996 00:10". Following this field, data values for each graphical representation produced in the first line are specified. These values represent performance data 404 that was collected during the second iteration of data collection script 412 on this date.

The graphical representations that were produced are stored as a GIF file. The date, project name, and host name that was written in the first line will be used to specify a directory and filename for storing the GIF file. In this example, the GIF file may be stored as c:\$netscan\$netdbn\$Jul. 8, 1996.gif, where netscan represents the project name, netdbn indicates the host name, and Jul. 8, 1996 indicates the date the particular performance data 404 was collected. Other conventions may be used.

Figure 8:
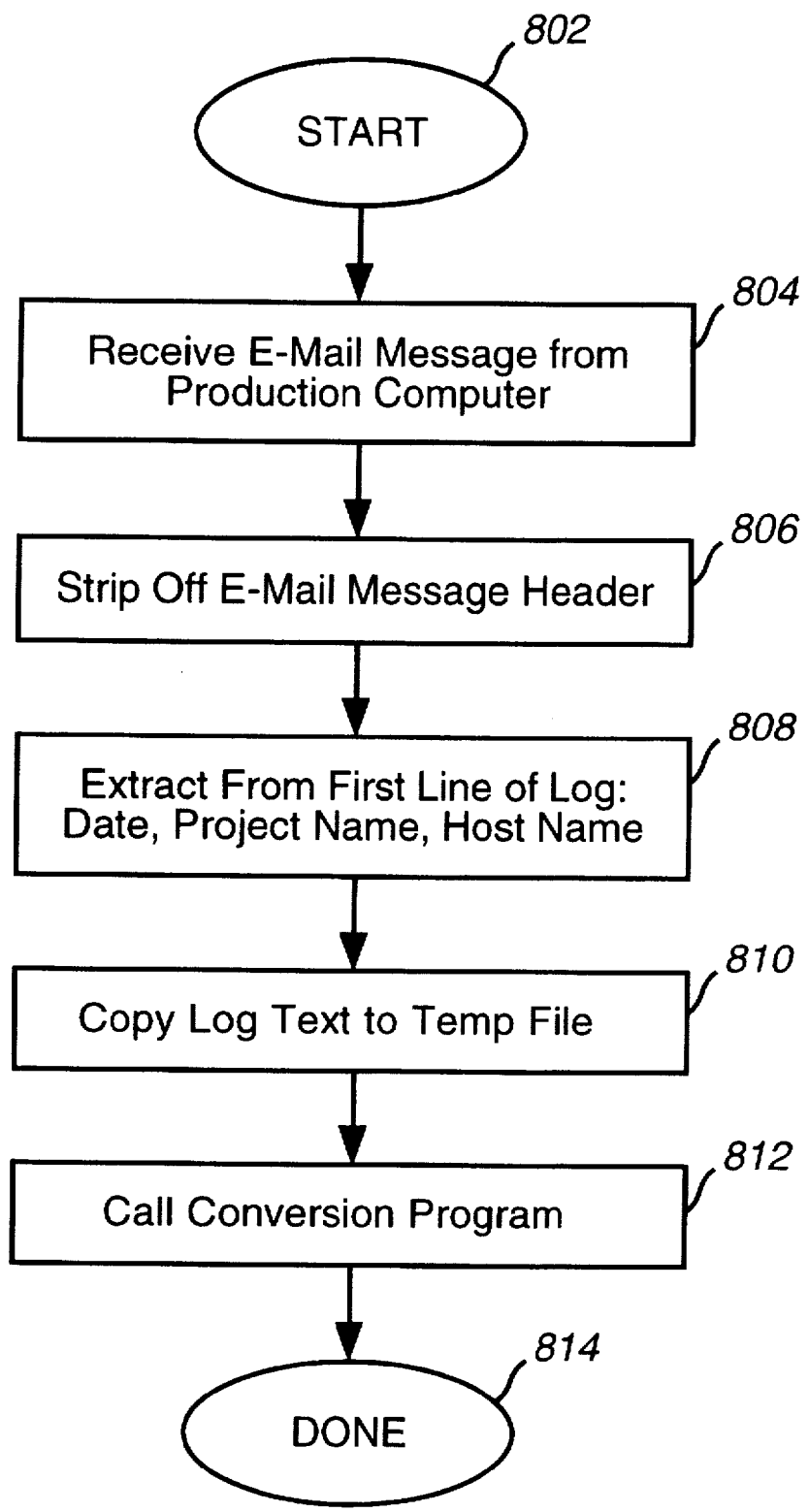
FIG. 8 is a flowchart of the operation of a parser script.

FIG. 8 is a flowchart 800 illustrating the process performed by parser script 502 of central collection system 204. Parser script 502 execution is automatically triggered when an e-mail message, addressed to parser script 502, is received by central collection system 204. Operation of flowchart 800 begins with step 802, where control immediately passes to step 804. In step 804, central collection system 204 receives a daily e-mail message from each production computer 202. The e-mail message includes performance data 404 for a particular production computer 202 for a single day.

In step 806, parser script 502 strips off the e-mail message header, leaving only the text from data log 410. Because all performance data 404 is in a common text format, the process of removing the e-mail message header is completely independent of the type of operating system 402 running on a particular production computer 202.

In step 808, parser script 502 extracts from the first line of data log 410 the date, project name, and host name. These fields will be used to specify the directory and filename under which the resulting GIF file will be stored.

In step 810, parser script 502 copies data log 410 to a temporary file of central collection system 204. This makes data log 410 available for use by conversion program 504.

In step 812, parser script 502 calls conversion program 504, passing two arguments: the temporary filename and the destination GIF file, triggering the execution of conversion program 504. After parser script 502 triggers conversion program 504, operation of flowchart 800 is complete, as indicated in step 814.

Figure 9:
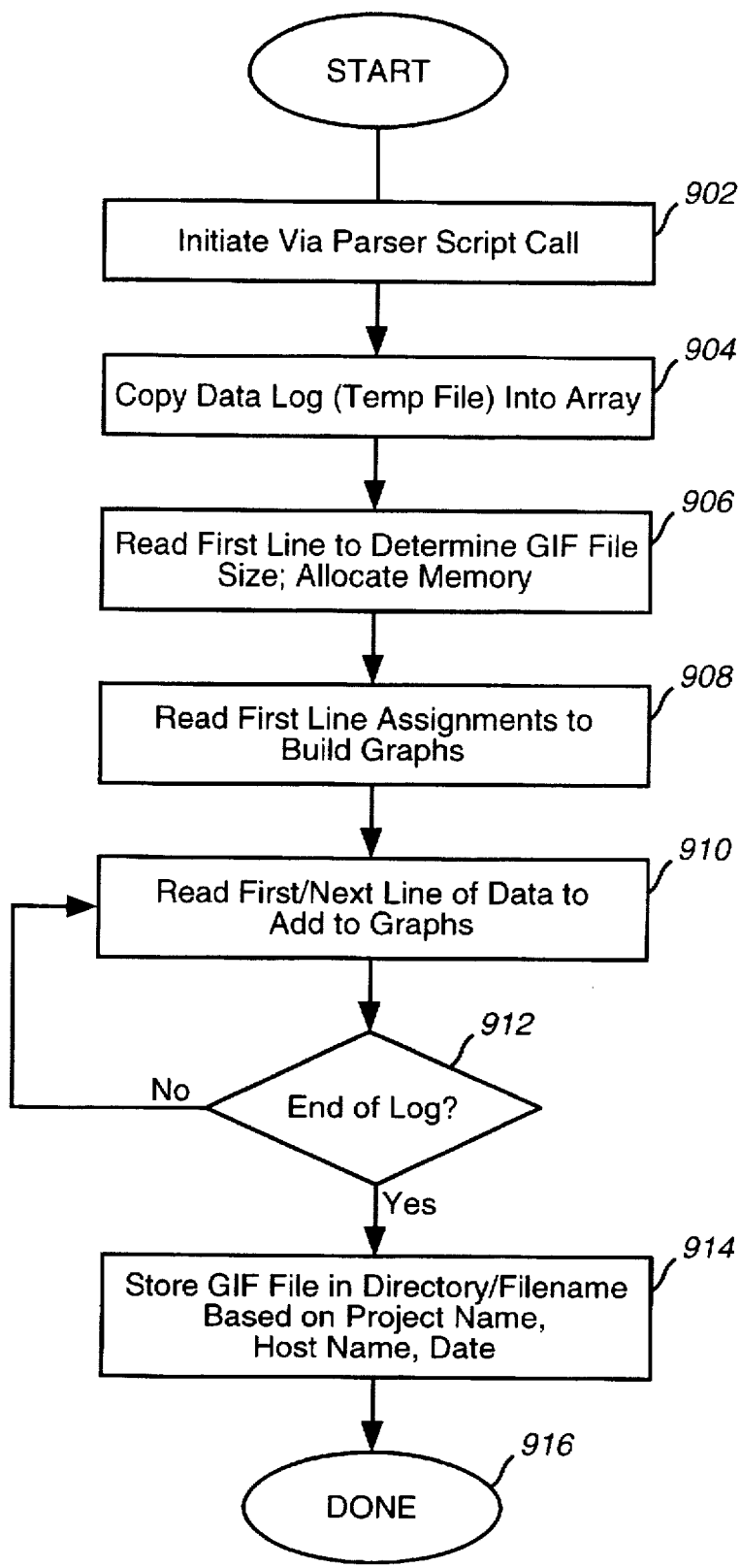
FIG. 9 is a flowchart of the operation of a conversion program.

FIG. 9 is a flowchart 900 illustrating the process performed by conversion program 504. Conversion program 504 reads performance data 404 from data log 410 and converts it to a series of graphical representations. The graphical representations are then stored as a file in GIF format. This file is then made available to the user community for viewing. Operation of flowchart 900 begins with step 902, where control immediately passes to step 904.

In step 904, conversion program 504 is initiated by the call from parser script 502. In step 906, conversion program 504 copies data log 410 into an array. Data log 410 is stored as a temporary file.

In step 908, conversion program 504 reads the first line of data log 410, which identifies each graphical representation to be built. From this, conversion program 504 can determine the size of GIF file needed, as well as the amount of memory required. Conversion program 504 allocates sufficient memory for each graphical representation.

In step 910, conversion program 504 reads from within the first line of data log 410 the line that assigns names to the graphical representations. Conversion program 504 then begins building the graphical representations.

In step 912, conversion program 504 determines whether the end of data log 410 has been reached. If not, then control of flowchart 900 returns to step 910, wherein operation of flowchart 900 cycles between step 910 and step 912 where conversion program 504 reads each successive line from data log 410 and adds the specified performance data 404 to each corresponding graphical representation. Each line contains performance data 404 from an iteration of data collection script 412 for each graphical representation. Conversion program 504 cycles between steps 910 and 912 until the end of data log 410 has been reached for each graphical representation.

When, as determined in step 912, the end of data log 410 has been reached, control of flowchart 900 passes to step 914. In step 914, conversion program 504 stores the resulting GIF file in GIF Database 506, under a directory/filename based on the project name, host name, and date. Following storage of the GIF file in GIF database 506, operation of flowchart 900 is complete, as indicated in step 916.

There are several methods of providing access to GIF files stored in GIF database 506. Internal web browsers 510 may provide direct access to and on-demand display of graphical image files to internal users (i.e., to production center 102). This may be accomplished using an Intranet (internal TCP/IP network) to provide multiple users at various sites access to graphical representations of performance data 404. External users (to production center 102) users may use IP network 104 and their own external web browsers 106 to access and have on-demand viewing of graphical image files.

Figure 10:
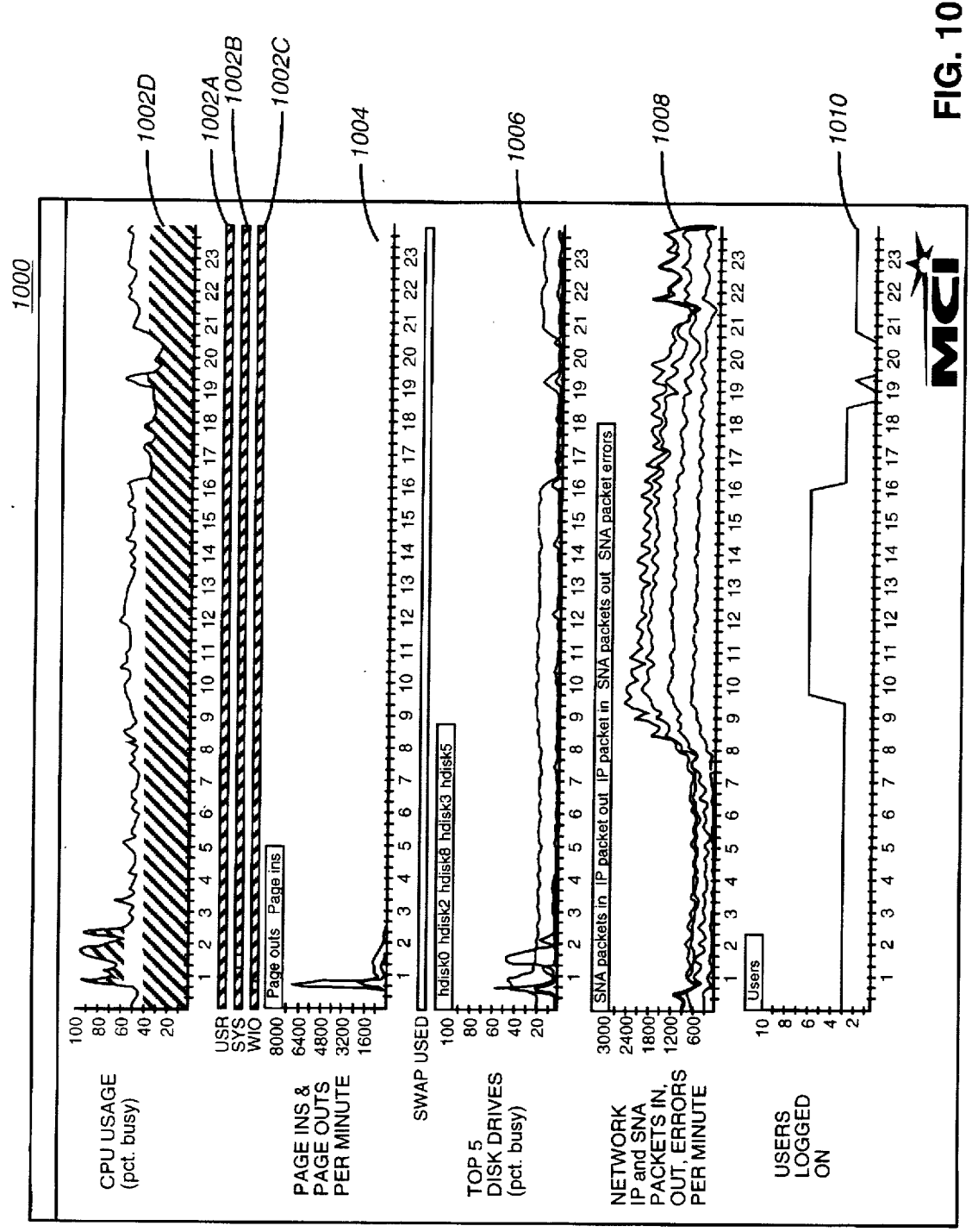
FIG. 10 is an exemplar of a graphical representation produced utilizing a preferred embodiment of the computer system performance monitoring tool of the present invention.

FIG. 10 is an exemplar of a graphical representation 1002 produced utilizing a preferred embodiment of the computer system performance monitoring tool of the present invention. Graphical representation 1002D is titled "CPU USAGE (pct.busy)": this was taken from the first line of the Data Log in FIG. 7 following the assignment field "% cb." The data points of this graphical representation 1002D were obtained from each line of the Data Log, following the fields "% CB". This graphical representation represents the percentage of CPU utilization of a particular Production Computer. It is a composite graph, in which each data point is composed of three parts: CPU utilization attributed to users, CPU utilization attributed to the system, and CPU utilization attributed waiting on input/output. Each of these parts are graphed in the bar graphs directly below, entitled "USR 1002A", "SYS 1002B", and "WIO 1002C".

The next graphical representation 1004 is titled "PAGE INS 7 PAGE OUTS PER MINUTE", and its data points were obtained from each line, following the assignment field "P00" for Page Ins and "P01" for Page Outs.

The next graphical representation 1006 is titled "TOP 5 DISK DRIVES (pct. busy)". It's data points were obtained from the ten-valued array that followed assignment fields "D00" through "D09". Conversion Program 510 plots up to five graphs from a single array. For this graph, it averages each disk drive value over the entire day and plots the top five total day values.

The last two graphs shown in FIG. 10 are built using the same method and format described above.

While the invention has been particularly shown and described with reference to preferred embodiments thereof, it will be understood by those skilled in the art that various changes in form and details may be made therein without departing from the spirit and scope of the invention.

What is claimed is:

1. A system for collecting performance data associated with a plurality of computer systems, at least two of which run different operating systems, comprising:

a set of data collection scripts resident on each of the plurality of computer systems, each said set of data collection scripts including performance data collecting commands that are native to an operating system running on an associated computer system, wherein each said set of data collection scripts collect data from the associated computer system using said performance data collecting commands and store the collected data in a text format that is common to the plurality of computer systems;

a graphical conversion program, resident on a central collection system, that receives the collected performance data text from the plurality of computer system and converts the collected performance data text to graphic image files;

at least one web server, coupled to the central collection system, that presents the graphic image files to web browsers; and an electronic mail network, wherein each of said set of data collection scripts comprise commands that send the collected performance data to the central collection system as text within electronic mail messages via the electronic mail network.

2. The system according to claim 1 further comprising:

a parser script, resident on the central collection system, that receives the electronic mail messages from the one or more computer systems and separates electronic mail text from electronic mail header information.

3. The system according to claim 1, wherein said performance data storing commands comprise:

flag commands that store one or more flags with the collected performance data, the one or more flags indicating types of graphical representations to be produced with the collected performance data.

4. The system according to claim 3, wherein said graphical conversion program comprises:

flag reading instructions that use the one or more flags to generate appropriate graphical images.

5. The system according to claim 1, wherein said data collection scripts comprise:

commands that store a date of data collection, a project name and a host name with the collected performance data.

6. The system according to claim 5, wherein said graphical conversion program comprises:

instructions that use the date, project name and host name to store graphical images under directories and filenames that correspond to the project name and host name.

7. The system according to claim 1, wherein said performance collecting data commands comprise:

cumulative performance data collecting commands that collect cumulative performance data; and calculating commands that calculate performance values from the cumulative performance data.

8. A method for collecting performance data associated with a plurality of computer systems, at least two of which run different operating systems, the method comprising the steps of:

(1) collecting performance data from each of the computer systems using commands that are native to an operating system running on each of the one or more computer systems;

(2) storing the collected performance data in a text format that is common to the plurality of computer systems and sending the collected performance data to the central collection system as text within electronic mail messages;

(3) sending the stored collected performance data to a central collection system;

(4) converting the stored collected performance data into graphic image files; and (5) presenting the graphic image files to web browsers.

9. The method according to claim 8, wherein step (3) comprises the step of:

(a) parsing the electronic mail text from electronic mail header information.

10. The method according to claim 9, wherein step (1) comprises the step of:

(a) storing flags with the collected performance data, the flags indicating types of graphical representations to be produced with the collected performance data.

11. The method according to claim 10, wherein step (4) comprises the step of:

(a) using the flags to generate appropriate graphical images.

12. The method according to claim 8, wherein step (1) comprises the step of:

(a) storing a date of data collection, a project name and a host name with the collected performance data.

13. The method according to claim 12, wherein step (3) comprises the step of:

(a) storing the graphical images under directories and filenames that correspond to the date of data collection, project name and host name.

14. The method according to claim 8, wherein step (1) comprises the steps of:

(a) collecting cumulative performance data; and (b) calculating performance values from the cumulative performance data.

* * * * *